United States Patent [19]

Pauling

[11] 3,919,250
[45] Nov. 11, 1975

[54] CATALYTIC REARRANGEMENT OF ACETYLENIC CARBINOLS TO A α,β-UNSATURATED CARBONYL COMPOUNDS

[75] Inventor: Horst Pauling, Bottmingen, Switzerland

[73] Assignee: Hoffmann-La Roche Inc., Nutley, N.J.

[22] Filed: Apr. 27, 1972

[21] Appl. No.: 248,046

[30] Foreign Application Priority Data

May 7, 1971 Switzerland.....................6750/72
Mar. 10, 1972 Switzerland.....................3564/72

[52] U.S. Cl. ...... 260/340.9; 260/478 R; 260/488 F; 260/488 H; 260/592; 260/593 R; 260/598; 260/599; 260/601 R; 260/602 R
[51] Int. Cl.$^2$ ............ C07D 317/14; C07C 47/26; C07C 47/20; C07C 49/44
[58] Field of Search ........ 260/601 R, 593 R, 602 R, 260/340.9, 478 R, 488 F, 488 H, 592, 599, 598

[56] References Cited
UNITED STATES PATENTS

| | | |
|---|---|---|
| 2,853,520 | 9/1958 | Newman .................... 260/593 R |
| 2,863,891 | 12/1958 | Granchelli et al. ............ 260/429 R |
| 2,994,711 | 8/1961 | Cohen........................ 260/429 R |

FOREIGN PATENTS OR APPLICATIONS 1,554,805  12/1968  France................. 260/593

OTHER PUBLICATIONS

J.A.C.S., Vol. 59, No. 1, (1937), pp. 118–121.

*Primary Examiner*—Donald G. Daus
*Assistant Examiner*—D. B. Springer
*Attorney, Agent, or Firm*—Samuel L. Welt; Jon S. Saxe; Richard A. Gaither

[57] ABSTRACT

Process for converting secondary and tertiary acetylenic carbinols to the corresponding α,β-unsaturated carbonyl compounds by rearranging the carbinol in the presence of a (trilower alkyl-, tricycloalkyl-, triphenyl- or triphenyl-lower alkyl-siloxy)-vanadium oxide catalyst.

23 Claims, No Drawings

CATALYTIC REARRANGEMENT OF ACETYLENIC CARBINOLS TO α,β-UNSATURATED CARBONYL COMPOUNDS

BACKGROUND OF THE INVENTION

Certain α,β-mono-unsaturated aldehydes have heretofore been obtained by the catalytic rearrangement of corresponding tertiary acetylenic carbinols or derivatives thereof. For example, acetylenic carbinols have been converted to unsaturated aldehydes by a process involving initially esterifying the carbinols and then rearranging the ester derivative with the aid of a silver or copper catalyst. Typically, such rearrangement reactions have required several process steps, including the formation of an allene ester intermediate.

In an effort to reduce the number of process steps required for such catalytic rearrangement processes, catalysts derived from a metal of the Vth to VIIth sub-group of the periodic chart, particularly vanadium, niobium, molybdenum, tungsten and rhenium, have been utilized instead of copper or silver catalysts. Such catalysts have permitted acetylenic carbinols to be expeditiously rearranged to unsaturated aldehydes in a single operation.

However, the use of such catalysts of the Vth to VIIth sub-group has not been found to be completely satisfactory. Considerable loss of catalyst activity has been found to inevitably occur during the course of the rearrangement reaction. In addition, it has been discovered that decomposition products are formed during the rearrangement reaction as the catalyst loses activity and that these decomposition products cause the aldehyde product to be destroyed as it is formed, thereby reducing product yields.

SUMMARY OF THE INVENTION

In accordance with this invention, a process is provided for obtaining α,β-unsaturated carbonyl compounds of the formula:

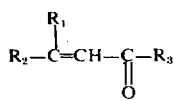

wherein $R_1$ is individually hydrogen or lower alkyl; $R_2$ is individually hydrocarbyl, cyclohydrocarbyl, or cyclohydrocarbyl substituted hydrocarbyl; $R_1$ taken together with $R_2$ form a cyclohydrocarbyl; $R_3$ is hydrogen, hydrocarbyl, cyclohydrocarbyl or cyclohydrocarbyl substituted hydrocarbyl; said hydrocarbyl and cyclohydrocarbyl being unsubstituted or substituted in one or more positions with lower alkyl, lower alkoxy, hydroxy, oxo, ketalized oxo, lower alkanoyl, aroyl, lower alkanoyloxy, or aroyloxy;

comprising rearranging an acetylenic carbinol of the formula:

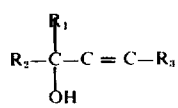

wherein $R_1$, $R_2$ and $R_3$ are as above;

in the presence of a catalyst of the formula:

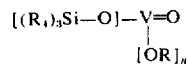

wherein $R_4$ is lower alkyl, cycloalkyl, phenyl, or phenyl lower alkyl any of which may be substituted by lower alkyl; R is $R_4$ or $(R_4)_3Si$-; $m$ is an integer of from 1 to 3; and $n$ is an integer of from 0 to 2; with the proviso that the sum of $m$ and $n$ is 3.

By utilizing the isomerisation catalyst of formula III, catalytic activity can be maintained during the reaction, permitting the catalyst to be used in repeated, subsequent reaction batches and minimizing the production of decomposition products which would reduce the yields of the carbonyl compound of formula I.

DETAILED DESCRIPTION OF THE INVENTION

As used throughout this application, the term "hydrocarbyl" denotes a monovalent, straight chain or branched chain aliphatic substituent consisting solely of carbon and hydrogen. The hydrocarbyl group can be saturated or unsaturated in one or more positions. Among the hydrocarbyl groups are included alkyl groups containing from 1 to 30 carbon atoms and alkenyl and alkynyl groups containing from 2 to 30 carbon atoms which can be unsubstituted or substituted in one or more positions with lower alkyl, lower alkoxy, hydroxy, oxo, ketalized oxo, lower alkanoyl, aroyl, lower alkanoyloxy, or aroyloxy groups. Among the preferred hydrocarbyl groups are included lower alkyls and groups having an isoprene or isoprene-like structure. Among the preferred substituted or unsubstituted hydrocarbyl groups denoted by $R_2$ and $R_3$ are included methyl, ethyl, 2,6-dimethyl-hepta-1,3,5-trienyl, 4-methylpent-3-enyl, 4,8-dimethyl-nona-3,7-dienyl, 4,8,12-trimethyltridecyl, 4-hydroxy-4-methyl-pentyl, and 4-methoxy-4-methylpentyl groups.

As also used throughout this application, the term "cyclohydrocarbyl" denotes a monovalent, cycloaliphatic substituent consisting solely of carbon and hydrogen. The cyclohydrocarbyl group can be saturated or unsaturated in one or more positions. The cyclohydrocarbyl substituent defined by $R_1$, $R_2$ and $R_3$ can be unsubstituted or substituted in one or more positions with lower alkyl, lower alkoxy, hydroxy, oxo, ketalized oxo, lower alkanoyl, aroyl, lower alkanoyloxy or aroyloxy groups. The substituted and unsubstituted cyclohydrocarbyl can include from 3 to 20 carbon atoms. Among the preferred cyclohydrocarbyl substituents which are defined by $R_1$, $R_2$ and $R_3$ are included cyclohexyl, cyclopropyl, cycloheptyl and cyclohexenyl. In the compounds of formula II, where $R_1$ and $R_2$ are joined together to form an unsubstituted or substituted cyclohydrocarbyl substituent, the preferred compounds are:

1-ethynyl-cyclohexanol,
4-ethynyl-4-hydroxy-1-oxo-3,5,5-trimethyl-cyclohex-2-ene, and
4-ethynyl-4-hydroxy-1,1-ethylenedioxy-3,5,5-trimethylcyclohex-2-ene.

As further used throughout this application, the term "cyclohydrocarbyl substituted hydrocarbyl" denotes cyclohydrocarbyl substituted hydrocarbyl groups wherein cyclohydrocarbyl and hydrocarbyl are defined as above. Both the cyclohydrocarbyl and hydrocarbyl groups can be unsubstituted or either one or both of the hydrocarbyl and cyclohydrocarbyl groups can be substituted in one or more positions with lower alkyl, lower alkoxy, hydroxy, oxo, ketalized oxo, lower alkanoyl, aroyl, lower alkanoyloxy or aroyloxy. Among the preferred cyclohydrocarbyl substituted hydro carbyl substituents defined by $R_2$ and $R_3$ are the groups wherein the hydrocarbyl moiety has an isoprene or isoprene-like structure, such as 2-(2,6,6-trimethyl-cyclohex-1-en-1-yl)-vinyl;
2-(4-oxo-2,6,6-trimethyl-cyclohex-1-en-1-yl)-vinyl;
2-(4,4-ethylenedioxy-2,6,6-trimethyl-cyclohex-1-en-1-yl)-vinyl;
6(2,6,6-trimethyl-cyclohex-1-en-1-yl)-4-methyl-hexa-1,3,5-trienyl;
6-(4-oxo-2,6,6-trimethyl-cyclohex-1-en-1-yl)-4-methyl-hexa-1,3,5-trienyl; and
6-(4,4-ethylenedioxy-2,6,6-trimethyl-cyclohex-1-en-1-yl)-4-methyl-hexa-1,3,5-trienyl groups.

As further used throughout this application, the term "lower alkyl" comprehends branched chain and straight chain, saturated aliphatic hydrocarbyl groups containing 1 to 7 carbon atoms, such as methyl, ethyl, propyl and isopropyl. As also used herein, the term "lower alkoxy" comprehends lower alkyloxy groups containing 1 to 7 carbon atoms such as methoxy and isopropoxy. As further used herein, the term "lower alkanoyl" comprehends lower alkyl acyl groups containing 1 to 6 carbon atoms such as formyl, acetyl, propionyl, and butyryl. As still further used herein, the term "aroyl" comprehends monocyclic, aromatic hydrocarbon acyl groups which may be unsubstituted or substituted in one or more positions with a lower alkylenedioxy, lower alkyl, halogen, nitro or lower alkoxy. The preferred aroyl is benzoyl. Also herein, the term "lower alkanoyloxy" comprehends lower alkyl acyloxy groups containing 1 to 6 carbon atoms such as acetoxy and propionyloxy. Further herein, the "aroyloxy" comprehends groups such as benzoyloxy. Still further herein, the term "cycloalkyl" comprehends cycloaliphatic groups of 3 to 6 carbon atoms, such as cyclohexyl. Also herein, the term "phenyl" comprehends unsubstituted phenyl.

As still further used throughout this application, the term "aliphatic", with reference to a hydrocarbyl or cyclohydrocarbyl group, denotes substituents containing no aromatic unsaturation but which can be otherwise saturated or unsaturated i.e. an alkyl or a group containing olefinic and/or acetylenic unsaturation. Also herein, the term "ketalized oxo" comprehends derivatives of an oxo group formed by reaction thereof with a lower alkanediol, preferably ethylene glycol, or a lower alkanol, preferably methanol, to yield a lower alkylenedioxy group. The preferred lower alkylenedioxy groups are the groups having 1 to 4 carbon atoms, particularly methylenedioxy and ethylenedioxy.

In accordance with the process of this invention, an acetylenic carbinol of formula II is rearranged in the presence of a catalyst of formula III to an α,β-unsaturated carbonyl compound of formula I. Preferably, the rearrangement is carried out by heating the carbinol in the presence of the catalyst. In carrying out this process, the catalyst is preferably present in an amount of about 0.1 to 5.0 mol percent (%) based on the carbinol substrate, with 1.5 to about 2.0 mol percent of the catalyst being especially preferred.

This rearrangement reaction is preferably carried out in an inert organic solvent. In carrying out this reaction, any conventional inert organic high-boiling solvent can be utilized. Among the preferred solvents are included aliphatic hydrocarbons, particularly heptane, cyclohexane, cyclododecane, decalin, paraffin and paraffin oil; aromatic hydrocarbons, particularly benzene, nitrobenzene, toluene and xylene; halogenated hydrocarbons, particularly chlorobenzene; ethers, particularly anisole and dioxane; and amines, particularly N-methylaniline. Polymeric silicon-containing solvents are also useful, especially silicon oils containing aliphatic or aromatic groups, particularly methyl phenyl polysiloxane.

In carrying out this rearrangement reaction, temperature and pressure are not critical, and this reaction can be suitably carried out at a temperature of between about room temperature (22°C.) and the boiling point of the reaction mixture and at atmospheric pressure. Preferably, the reaction is carried out at a temperature between 50°C. and 200°C., with a temperature of about 100° to 160°C. being particularly preferred. If desired, the isomerization can also be carried out under pressure, in which case pressures up to about 50 atmospheres can be used.

The time for this reaction can vary within wide ranges. In general, it is preferred to utilize about 2 to 20 hours for the reaction. Also, this reaction can be carried out in the presence of or with the exclusion of air.

The α,β-unsaturated carbonyl compound of formula I, which is obtained as the product of the rearrangement reaction of this invention, can be separated from the unreacted portions of the acetylenic carbinol starting material in a well known manner, preferably by rectification. The unreacted carbinol portions can be cycled to the next batch. With this procedure, there are obtained, in general, conversions of 70% to 80% and, depending on the carbinol starting material employed, yields of more than 90% based on the reacted carbinol.

Among the important α,β-unsaturated carbonyl compounds of formula I are included compounds of the formula:

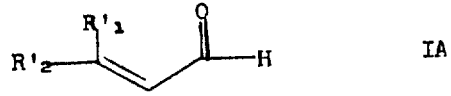

IA wherein $R'_1$ and $R'_2$ are taken together to form an unsubstituted cyclohydrocarbyl or a cyclohydrocarbyl substituted with lower alkyl, lower alkoxy, hydroxy, oxo or ketalized oxo;

compounds of the formula:

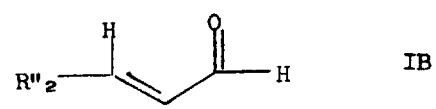

IB wherein $R''_2$ is unsubstituted cyclohydrocarbyl or cyclohydrocarbyl substituted with lower alkyl, lower alkoxy, hydroxy, oxo or ketalized oxo;

unsubstituted and hydroxy and alkoxy substituted compounds of the formula:

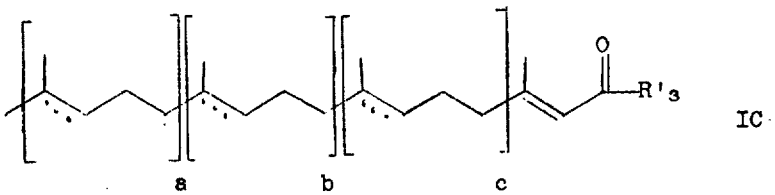

IC wherein $R'_3$ is hydrogen or lower alkyl; $a = 1, b = 1$ and $c = 1$ or $a = 0, b = 1$ and $c = 1$ or $a = 0, b = 0$ and $c = 1$ or $a = 0, b = 0$ and $c = 0$; and the dotted bonds can be optionally hydrogenated and wherein hydroxy and lower alkoxy substituents may be present:

and compounds of the formula:

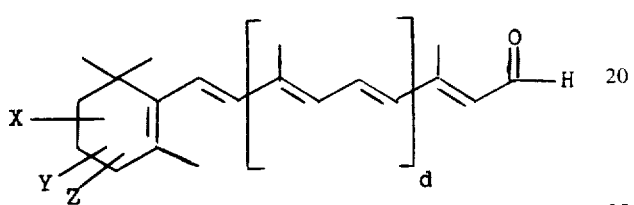

wherein $d$ is an integer of 0 to 1; X is hydroxy or hydrogen; and Y and Z are hydrogen or taken together oxo.

In accordance with the rearrangement reaction of this invention, among the particularly important α,β-unsaturated carbonyl compounds of formula I are included:

cyclohexylidene acetaldehyde;
(4,4-ethylenedioxy-2,6,6-trimethyl-cyclohex-2-en-1-ylidene)-acetaldehyde;
cinnamaldehyde;
2-methyl-hept-2-en-4-one;
senecioaldehyde;
citral;
7-hydroxy-citral;
7-methoxy-citral;
farnesal;
phytal;
β-$C_{15}$-aldehyde; and
vitamin A aldehyde.

Among the catalysts of formula III, preferred are the compounds wherein $R_4$ is lower alkyl (particularly methyl, ethyl, isopropyl or n-butyl), phenyl, tolyl or xylyl, or unsubstituted phenyl lower alkyl (particularly benzyl or phenethyl). Among the preferred catalysts, particularly preferred are the compounds of formula III wherein $m$ is 3 and $n$ is 0, quite particularly tris-[trimethyl-siloxy]-vanadium oxide and tris-[triphenyl-siloxy]-vanadium oxide.

The acetylenic carbinols of formula II utilized as starting materials in the process of this invention for conversion to the preferred carbonyl compounds of formulae IA, IB, IC and ID, hereinbefore, are compounds of the formulae:

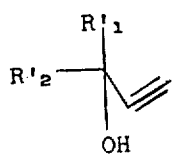

IIA wherein $R'_1$ and $R'_2$ are as above;

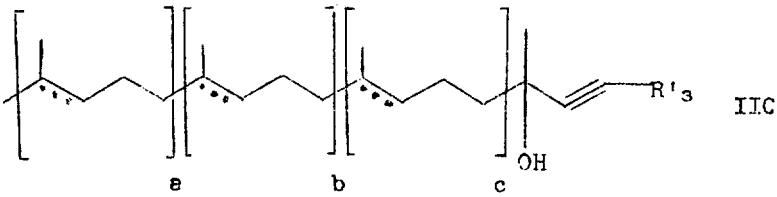

IIB wherein $R''_2$ is as above;

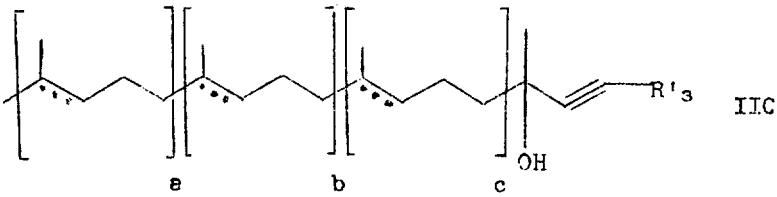

IIC wherein $R'_3$, $a$, $b$, $c$ and the dotted bonds are as above; and wherein hydroxy and lower alkoxy substituents may be present;

and

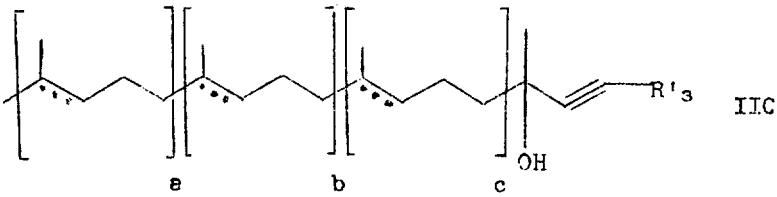

Among the acetylenic carbinols of formula II are included the following important cyclohydrocarbyl compounds:

1-ethynyl-cyclohexanol;
4-ethynyl-4-hydroxy-1-oxo-3,5,5-trimethyl-cyclohex-2-ene; and
4-ethynyl-4-hydroxy-1,1-ethylenedioxy-3,5,5-trimethylcyclohex-2-ene;

as well as the following acyclic hydrocarbyl compounds:

dehydrolinalool;
3-hydroxy-3-methyl-but-1-yne;
3-hydroxy-3,7,11-trimethyl-dodeca-6,10-dien-1-yne; and
7-methoxy-dehydrolinalool.

The catalysts of formula III can be prepared according to known methods. The catalysts can be prepared, for example, according to one of the following procedures:

i. the reaction of, for example, vanadium pentoxide with, for example, a trialkyl silanol of the formula [alkyl]$_3$-SiOH or a triphenyl silanol of the formula [phenyl]$_3$SiOH with azeotropic removal of the water formed in the reaction with the aid of an entraining agent such as, for example benzene;

ii. the reaction of, for example, vanadium oxytrichloride with, for example, a trialkyl silanol or triphenyl silanol in the presence of a base such as pyridine or ammonia;

iii. the reaction of, for example, vanadium oxytrichloride with, for example, a trialkyl alkali silanolate of the formula [alkyl]$_3$SiOMe(I) or a triphenyl alkali silanolate of the formula [phenyl]$_3$SiOMe(I);

iv. the reaction of, for example, a vanadium acid ester of the formula [alkoxy]$_3$-V=O with, for example, a trialkyl silanol or triphenyl silanol, if desired in the presence of catalytic amounts of an alkyl- or phenyl alkali silanolate (e.g. a trialkyl alkali silanolate);

v. the reaction of, for example, silver orthovanadate of the formula $Ag_3VO_4$, with for example, a trialkyl silyl halide of the formula [alkyl]$_3$SiCl or a triphenyl silyl halide of the formula [phenyl]₃SiCl in a solvent such as, for example, benzene or methylene chloride;

vi. the reaction of, for example, vanadium pentoxide with, for example, a hexaalkyl disiloxane of the formula [alkyl]₃SiOSi[alkyl]₃ at an elevated temperature, for example, at about 100°C; and vii. the double reaction of a vanadium acid ester of the formula [alkoxy]₃-V=O with a trialkyl silyl ester or triphenyl silyl ester, for example, of tripropyl orthovanadate with trimethyl silyl acetate with the expulsion of propyl acetate.

In accordance with the rearrangement reaction of this invention, it has been found that the activity of the catalyst of formula III is retained during the reaction, permitting the catalyst to be cycled to subsequent batches for repeated use. It has also been found that the particularly preferred catalysts of formula III, wherein $n=3$, provide surprisingly higher yields of and higher conversions to the $\alpha,\beta$-unsaturated carbonyl compound than is provided by catalysts heretofore used. In addition, these particularly preferred catalysts retain their activity over many batches and form practically no decomposition products which interfere with the yields of $\alpha,\beta$-unsaturated carbonyl compound of formula I.

The examples which follow further illustrate this invention.

The silicon oil employed in the Examples 3, 7 and 13 has a boiling point of > 150°C/10⁻² mm Hg and a density of $d_{20}^4$ of 0,975.

The paraffin oil employed in the Examples 10–14 has a boiling point of >170°C/10⁻¹ mm Hg.

EXAMPLE 1

A mixture of 15.2 g of 3-hydroxy-3,7-dimethyl-octa-6-en-1-yne (dehydrolinalool), 0.52 g of tris-[trimethylsiloxy]-vanadium oxide and 750 g of liquid paraffin [boiling point >170°/0.1 mmHg] is stirred at 125°C for 15 hours in a dry atmosphere. The 3,7-dimethyl-2,6-octadienal (citral) formed is thereafter separated from the unreacted linalool by rectification. The conversion of the dehydrolinalool employed amounts to 11.7 g, corresponding to 77%. The yield of citral is 11.25 g, corresponding to 96% conversion based on reacted dehydrolinalool.

EXAMPLE 2

15.2 g of dehydrolinalool, 2 g of tris-[triphenylsiloxy]-vanadium oxide and 85 ml of high-boiling paraffin oil ($d_{20}^4 = 0.885$) are stirred at 140°C. for 3.5 hours in the absence of moisture. The citral formed is thereafter separated by rectification. 10.5 g (69.2%) of dehydrolinalool react with the formation of 9.3 g of citral. The yield of citral amounts to 88.5% based on reacted dehydrolinalool. After distillation of all material which is liquid below 50°C/10⁻² mmHg, fresh dehydrolinalool can be added periodically to the solution of the catalyst in paraffin oil and reacted in the manner described earlier. Even after employing the foregoing catalyst system on three batches, its catalytic activity does not fall off to any appreciable extent, repeated comparable results being obtainable.

EXAMPLE 3

15.2 g of dehydrolinalool and 0.6 g of tris-[dimethylethyl-siloxy]-vanadium oxide are heated to 130°C for 5 hours in 300 ml of silicon oil. The citral formed is then separated by rectification. The conversion of dehydrolinalool amounts to 11.3 g, corresponding to 74.3%. The yield of citral is 9.7 g, corresponding to an 85.8% conversion based on reacted dehydrolinalool.

EXAMPLE 4

15.2 g of dehydrolinalool, 1.06 of bis-[triphenylsiloxy]-[trimethyl-siloxy]-vanadium oxide and 150 ml of silicon oil are heated to 140°C for 3 hours while stirring in an inert gas atmosphere. The citral formed is then separated by rectification. The conversion of the dehydrolinalool employed amounts to 10.9 g, corresponding to 71.7%. The yield of citral is 9.7 g, corresponding to 89% conversion based on reacted dehydrolinalool.

EXAMPLE 5

15.2 g of dehydrolinalool, 1.5 g of bis-[trimethylsiloxy]-[triphenyl-siloxy]-vanadium oxide and 150 ml of nitrobenzene are heated to 150°C. for 2 hours with the exclusion of moisture. The citral formed is then separated by rectification. The conversion of dehydrolinalool employed amounts to 11.1 g, corresponding to 73%. The yield of citral is 9.4 g, corresponding to 84.6% conversion based on reacted dehydrolinalool.

EXAMPLE 6

15.2 g of dehydrolinalool, 1 g of bis-[triphenylsiloxy]-isopropoxy-vanadium oxide and 90 ml of high-boiling paraffin oil ($d_{20}^4 = 0.885$) are heated at 125° for 10 hours with the exclusion of moisture. The citral formed is separated by rectification. The conversion of dehydrolinalool employed amounts to 9.5 g, corresponding to 62.5%. The yield of citral is 8.1 g, corresponding to 85.3% conversion based on reacted dehydrolinalool.

EXAMPLE 7

15.2 g of dehydrolinalool, 0.92 g of [triphenyl-siloxy]-bis-[isopropoxy]-vanadium oxide and 170 ml of silicon oil are heated to 125°C for 6 hours with the exclusion of moisture. The citral formed is separated by rectification. The conversion of dehydrolinalool employed amounts to 7 g, corresponding to 46%. The yield of citral is 5.75 g, corresponding to 82.2% conversion of reacted dehydrolinalool.

EXAMPLE 8

8.4 g of 3-hydroxy-3-methyl-but-1-yne, 1 g of tris-[trimethyl-siloxy]-vanadium oxide and 50 ml of high-boiling paraffin oil ($d_{20}^4 = 0.885$) are stirred at 110°C. for 30 hours with the exclusion of moisture. The 3-methylbut-2-en-al formed is then separated by rectification. The conversion of the acetylenic carbinol employed amounts to 5.9 g, corresponding to 70.3%. The yield of 3-methyl-but-2-en-1-al is 5.4 g, corresponding to 91.5% conversion of the reacted acetylenic carbinol.

EXAMPLE 9

22 g of 3-hydroxy-3,7,11-trimethyl-dodeca-6,10-dien-1-yne, 0.7 g of tris-]trimethyl-siloxy]-vanadium oxide and 200 ml of silicon oil are heated to 130°C for 6 hours with the exclusion of moisture. The 3,7,11-trimethyl-dodeca-2,6,10-trien-1-al formed is then separated by rectification. The conversion of the acetylenic carbinol employed amounts to 13.2 g, corresponding to 60%. The yield of 3,7,11-trimethyl-dodeca-2,6,10-trien-1-al is 11.2 g, corresponding to 84.8% conversion of the reacted acetylenic carbinol.

EXAMPLE 10

29.4 g of 3-hydroxy-3,7,11,15-tetramethyl-hexadec-1-yne, 0.75 g of tris-[trimethyl-siloxy]-vanadium oxide and 500 ml of high-boiling paraffin oil are heated to 125°C. for 8 hours with the exclusion of moisture. The 3,7,11,15-tetramethyl-hexadec-2-en-1-al formed is separated by rectification. The conversion of the acetylenic carbinol employed amounts to 11.3 g, corresponding to 38.4%. The yield of 3,7,11,15-tetramethyl-hexadec-2-en-1-al is 9.1 g, corresponding to 80.5% conversion of reacted acetylenic carbinol.

EXAMPLE 11

18.4 g of 3-hydroxy-7-methoxy-3,7-dimethyl-oct-1-yne (7-methoxy-dehydrolinalool), 0.7 g of tris-[trimethyl-siloxy]-vanadium oxide and 150 ml of high-boiling paraffin oil are stirred at 125°C for 7 hours with the exclusion of moisture. The 7-methoxy-3,7-dimethyl-oct-2-en-1-al formed is separated by rectification. The conversion of the acetylenic carbinol employed amounts to 11.6 g, corresponding to 63%. The yield of 7-methoxy-3,7-dimethyl-oct-2-en-1-al is 10.8 g, corresponding to 93.2% conversion of reacted acetylenic carbinol.

EXAMPLE 12

12.4 g of 1-ethynyl-1-cyclohexanol, 2 g of tris-[triphenyl-siloxy]-vanadium oxide and 100 ml of high-boiling paraffin oil are heated to 130°C for 6 hours with the exclusion of moisture. The conversion of the acetylenic carbinol employed amounts to 8.9 g, corresponding to 71.7%.

The following two isomerization products are isolated from this reaction by rectification:

cyclohexylidene-acetaldehyde (I) b.p. 88°C/13 mm Hg cyclohex-1-en-1-yl-acetaldehyd (II) b.p. 82°C/13 mm Hg.

The total yield of I and II is 7.8 g, corresponding to 87.6% conversion of the reacted 1-ethynyl-1-cyclohexanol. The molar proportion of the two resulting aldehydes I and II to one another is 38.4:61.6.

EXAMPLE 13

13.2 g of 3-hydroxy-3-phenyl-prop-1-yne, 2 g of tris-[triphenyl-siloxy]-vanadium oxide and 100 ml of silicon oil are heated to 140°C for 6 hours with the exclusion of moisture. The cinnamaldehyde formed is separated by rectification. The conversion of the acetylenic carbinol employed amounts to 12.1 g, corresponding to 91.6%. The yield of cinnamaldehyde is 11.4 g, corresponding to 94.3% conversion of the reacted 3-hydroxy-3-phenyl-prop-1-yne.

EXAMPLE 14

12.6 g of 2-hydroxy-2-methyl-hept-3-yne, 0.7 g of tris-[trimethyl-siloxy]-vanadium oxide and 150 ml of high-boiling paraffin oil are heated at 130°C for 5 hours with the exclusion of moisture. The 2-methyl-hept-2-en-4-one formed is separated by rectification. The conversion of the acetylenic carbinol employed amounts to 11.6 g, corresponding to 92%. The yield of 2-methyl-hept-2-en-4-one is 11.0 g, corresponding to 94.8% conversion of the reacted acetylenic carbinol.

EXAMPLE 15

10 g of 4-ethynyl-4-hydroxy-1,1-ethylenedioxy-3,5,5-trimethyl-cyclohex-2-ene, 0.15 g of hydroquinone, 0.02 ml of tris-[trimethyl-siloxy]-vanadium oxide and 100 ml of dry mesitylene are heated to boiling under reflux conditions for 16 hours with the exclusion of moisture. The solvent is subsequently distilled off at 40°C under reduced pressure. The residual isomer mixture of cis/trans (4,4-ethylenedioxy-2,6,6-trimethyl-cyclohex-2-en-1-ylidene)-acetaldehyde boils at 110°-125°C/0.1 mmHg after rectification in a high vacuum. The conversion of the acetylenic carbinol employed amounts to 8 g, corresponding to 80%. The aldehyde product is obtained in a yield of 7.2 g, corresponding to 90% conversion of the reacted acetylenic carbinol.

EXAMPLE 16

800 ml of liquid ammonia are conducted into a 2 liter 3-necked flask which is provided with a mechanical stirrer, dropping funnel and Claisen head having a dry-ice cooler. 10 g of lithium are then introduced into the flask within 30 minutes while stirring. The mixture is stirred for 60 minutes. Sufficient acetylene is passed into the deep-blue solution until it becomes almost colorless. The dry-ice cooler is removed and replaced by a tube filled with potassium hydroxide. The ammonia is evaporated off and replaced by the same volume of diethyl ether. The suspension of lithium acetylide thus obtained is treated at room temperature within 30 minutes with a solution of 20 g of 1,1-ethylenedioxy-3,5,5-trimethyl-cyclohex-2-en-4-one in 100 ml of diethyl ether. The mixture is stirred for 18 hours and then poured cautiously onto a mixture of ice and 400 ml of a 25% by weight ammonium chloride solution. The ether phase is separated, washed with water, dried over sodium sulphate, filtered and evaporated under reduced pressure. The residual crystalline 4-ethynyl-4-hydroxy-1,1-ethylenedioxy-3,5,5-trimethyl-cyclohex-2-ene melts at 85°-86°C after recrystallization from ethyl acetate/petroleum ether.

I claim:

1. In a process for obtaining alpha,beta-unsaturated carbonyl compounds of the formula:

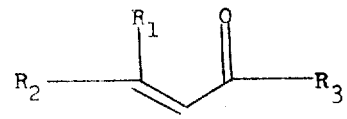

wherein $R_1$ is individually hydrogen or lower alkyl having from 1 to 7 carbon atoms; $R_2$ is individually straight chain saturated or olefinically unsaturated aliphatic hydrocarbyl, cyclohydrocarbyl or cyclohydrocarbyl substituted straight chain saturated or olefinically unsaturated aliphatic hydrocarbyl; $R_1$ taken together with $R_2$ form a cyclohydrocarbyl; $R_3$ is hydrogen, straight chain saturated or olefinically unsaturated aliphatic hydrocarbyl, cyclohydrocarbyl or cyclohydrocarbyl substituted straight chain saturated or olefinically unsaturated alphatic hydrocarbyl; said aliphatic hydrocarbyl and cyclohydrocarbyl may be unsubstituted or substituted with from 1 to 3 lower alkyl groups having from 1 to 3 carbon atoms, and from zero to 1 substituents selected from the group consisting of lower alkoxy having from 1 to 7 carbon atoms, hydroxy, oxo, oxo ketalized with ethylene glycol, lower alkanoyl of from 2 to 6 carbon atoms, benzoyl, lower alkanoyloxy having from 2 to 6 carbon atoms, or benzoyloxy; wherein said aliphatic hydrocarbyl group has from 1 to 30 carbon atoms and said cyclohydrocarbyl group has from 4 to 20 carbon atoms;

by rearranging in an inert organic solvent medium an acetylenic carbinol of the formula:

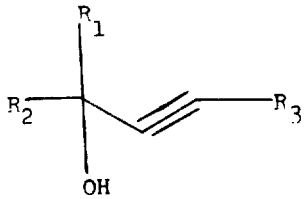

wherein $R_1$, $R_2$ and $R_3$ are as above;
the improvement which comprises carrying out said rearrangement, in the presence of a catalyst of the formula:

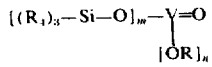

wherein $R_4$ is lower alkyl, cyclohexyl, phenyl or phenyl lower alkyl, any of which may be substituted by lower alkyl; R is $R_4$ or $(R_4)_3Si-$; $m$ is an integer of from 1 to 3; and $n$ is 0, 1 or 2; with the proviso that the sum of $m$ and $n$ is 3; and the lower alkyl group has from 1 to 7 carbon atoms; and at a temperature of from 22°C. to the boiling temperature of the reaction medium.

2. The process of claim 1 wherein said catalyst is of the formula:

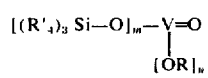

wherein R, $m$ and $n$ are as above and $R'_4$ is lower alkyl, phenyl or unsubstituted phenyl lower alkyl.

3. The process of claim 2 wherein said catalyst is of the formula:
$[(R'_4)_3-Si-O]_3-V=O$ wherein $R'_4$ is as above.

4. The process of claim 3 wherein said catalyst is tris-[trimethyl-siloxy]-vanadium oxide or tris-[triphenysiloxy]-vanadium oxide.

5. The process of claim 1 wherein said process is carried out at a temperature of 100°C. to 160°C.

6. The process of claim 1 wherein said process is carried out in a hydrocarbon or silicon oil.

7. The process of claim 1 wherein said catalyst is present in an amount of 0.1 to 5.0 mol percent based on the carbinol substrate.

8. The process of claim 7 wherein said catalyst is present in an amount of about 1.5 to 2.0 mol percent.

9. The process of claim 1 wherein said carbinol is a compound of the formula:

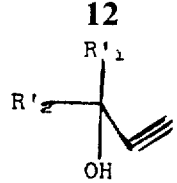

wherein $R'_1$ and $R'_2$ are taken together to form an unsubstituted cyclohydrocarbyl or a cyclohydrocarbyl substituted with lower alkyl, lower alkoxy, hydroxy, oxo, or ketalized oxo.

10. The process of claim 9 wherein said carbinol is 1-ethynyl-cyclohexanol.

11. The process of claim 9 wherein said carbinol is 4-ethynyl-4-hydroxy-1,1-ethylenedioxy-3,5,5-trimethylcyclohex-2-ene.

12. The process of claim 1 wherein said carbinol is a compound of the formula:

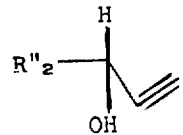

wherein $R''_2$ is unsubstituted cyclohydrocarbyl or cyclohydrocarbyl substituted with lower alkyl, lower alkoxy, hydroxy, oxo, or ketalized oxo.

13. The process of claim 12 wherein said carbinol is 3-hydroxy-3-phenyl-prop-1-yne.

14. The process of claim 1 wherein said carbinol is an unsubstituted compound of the formula:

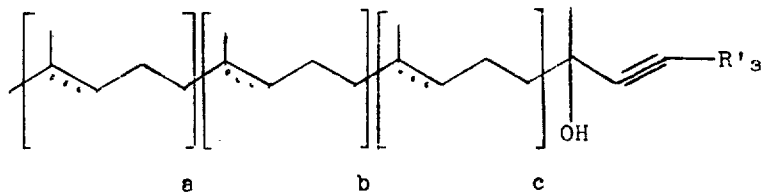

wherein $R'_3$ is hydrogen or lower alkyl; and $a = 1$, $b = 1$ and $c = 1$ or $a =$ zero, $b = 1$ and $c = 1$, or $a =$ zero, $b =$ zero and $c = 1$ or $a =$ zero, $b =$ zero and $c =$ zero; and the dotted bonds can be optionally hydrogenated;
or hydroxy or alkoxy substituted derivatives thereof.

15. The process of claim 14 wherein said carbinol is 6-hydroxy-6-methyl-hept-4-yne.

16. The process of claim 14 wherein said carbinol is 3-hydroxy-3,7,11,15-tetramethyl-hexadec-1-yne.

17. The process of claim 14 wherein said carbinol is 3-hydroxy-3,7,11-trimethyl-dodeca-6,10-dien-1-yne.

18. The process of claim 14 wherein said carbinol is 3-hydroxy-3,7-dimethyl-oct-6-en-1-yne.

19. The process of claim 14 wherein said carbinol is 3-hydroxy-7-methoxy-3,7-dimethyl-oct-1-yne.

20. The process of claim 14 wherein said carbinol is 3-hydroxy-3-methyl-but-1-yne.

21. The process of claim 14 wherein said carbinol is 3,7-dihydroxy-3,7-dimethyl-oct-1-yne.

22. The process of claim 1 wherein said carbinol is a compound of the formula:

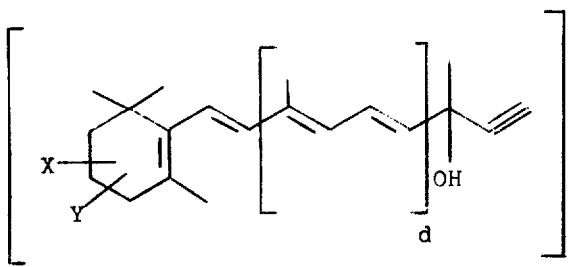
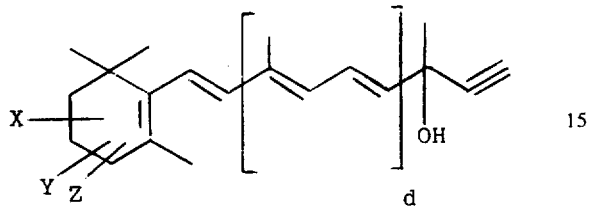
wherein *d* is an integer of 0 to 1; X is hydrogen or hydroxy; and Y and Z are hydrogen or taken together oxo.
23. The process of claim 22 wherein said carbinol is 5-(2,6,6-trimethyl-cyclohex-1-en-1-yl)-3-hydroxy-3-methylpenta-4-en-1-yne.
* * * * *